Patented May 10, 1949

2,469,823

UNITED STATES PATENT OFFICE 2,469,823

ALKYLATION OF THIOPHENE

Rowland C. Hansford, Woodbury, and Philip D. Caesar, Wenonah, N. J., assignors to Socony-Vacuum Oil Company, Incorporated, a corporation of New York No Drawing. Application November 29, 1944, Serial No. 565,788

8 Claims. (Cl. 260—329)

This invention relates generally to the synthesis of the homologues of thiophene, and is more particularly concerned with a process for alkylating thiophene and alkyl thiophenes in the presence of catalytic material comprising boron trifluoride.

Alkylation reactions are well known in the art and connote the union between alkyl radicals and molecules of organic compounds under conditions of temperature, pressure and time ordinarily referred to in the art as alkylating conditions. The compounds thus produced are called alkymers and represent, structurally, the addition of the original alkyl radical to the organic compound molecule. The product of an alkylation reaction is broadly referred to in the art as an alkylate and ordinarily contains the alkymer, residual amounts of reactants and products of secondary reactions that occur concurrently with the alkylation reaction.

Generally speaking, the temperature and to a certain extent the pressure and time of reaction employed in alkylation operations depend upon whether the alkylation is effected in the absence (when at all possible), or presence of alkylation catalysts. The two methods are generally referred to as thermal and catalytic alkylation, respectively.

In alkylation reactions, the alkyl radical may be furnished by a variety of substances accordingly known in the art as alkylating agents. Olefinic hydrocarbons, alkyl halides, alcohols, aralkyl halides, and less frequently, organic and inorganic esters, ethers, alkyl sulfates, alkene oxides and mercaptans have been proposed as alkylating agents.

As is well known to those familiar with the art, the synthesis of the homologues of thiophene has been effected mostly through the Wurtz reaction, i. e., by condensing the iododerivatives of thiophene with iodo- or bromo-alkyls in the presence of metallic sodium. However, the yields of thiophene homologues have been always small and the cost of the reagents involved have limited somewhat the commercial utilization of this synthesis. The Friedel-Crafts synthesis has also been proposed for preparing thiophene homologues, i. e., the condensation of thiophene and halogen alkyls in the presence of aluminum chloride. This reaction although applicable with considerable success in the alkylation of aromatic hydrocarbons is only moderately successful where thiophene is involved. This appears to be due to the relative instability of the thiophene ring, the aluminum chloride attacking the sulfur and causing many undesirable secondary reactions with concomitantly low yields of alkyl thiophenes.

The alkylation of thiophene has been an exceedingly difficult reaction to carry out with good yields of desired product. The usual alkylation catalysts such as aluminum halides, sulfuric acid and hydrogen fluoride all cause excessive resinification of the thiophene reactant. The resinification usually occurs before alkylation can be effected, and if the expected reaction product is formed, it is only in very small amounts.

We have discovered that the homologues of thiophene may be obtained in an efficient manner by reacting thiophene or alkyl thiophenes with alkylating agents in the presence of alkylating catalysts comprising boron trifluoride.

We have found that alkylating catalysts comprising boron trifluoride effect the alkylation reaction smoothly and specifically, in contrast to the more conventional alkylation catalysts, i. e., aluminum halides, sulfuric acid, and hydrogen fluoride. In accordance with our process, the alkylating catalysts comprising boron trifluoride do not cause undue polymerization or condensation of either reactant, the products being almost entirely alkyl thiophenes having one or more side-chains corresponding to that of the alkylating agent.

Accordingly, it is an object of the present invention to provide an efficient process for synthesizing the homologues of thiophene. Another object is to provide a process for alkylating thiophene and alkyl thiophenes. A more specific object is to afford a process for catalytically alkylating thiophene and alkyl thiophenes. A very important object is to afford a process capable of carrying out the above objects by reacting thiophene or alkyl thiophenes with alkylating agents in the presence of alkylating catalysts comprising boron trifluoride. Other objects and advantages of the present invention will become apparent to those skilled in the art from the following description.

Broadly stated, the present invention provides a process for alkylating thiophene or alkyl thiophenes which includes contacting thiophene or an alkyl thiophene with an alkylating agent in a reaction zone under alkylating conditions, in the presence of an alkylating catalyst comprising boron trifluoride.

Boron trifluoride or its complexes with materials such as ethers, alcohols, unsubstituted fatty acids, aldehydes, ketones, organic acid anhydrides, and esters may be used as alkylating catalysts in the process of our invention. Boron trifluoride complexes with ethyl ether, propyl alcohol, acetic acid, formaldehyde, acetone, propionic anhydride, and ethyl acetate may be mentioned by way of non-limiting examples. While these solvents form true complexes with boron trifluoride which in most cases have somewhat definite compositions, the essential catalytic component of these complexes is boron trifluoride. The amounts of alkylating catalyst to be used in our process ordinarily vary between about 5% and about 50% based on the weight of the charge.

It is generally believed that the chemical behavior of thiophene is very similar to that of benzene. However, there are some very striking differences. This is illustrated by the fact that we have found for instance, that the alkylating catalysts ordinarily used for the alkylation of benzene are not suitable for the alkylation of thiophene. Moreover, catalysts which readily effect the alklation of thiophene will not always effect the alkylation of benzene. As a matter of fact, the catalysts which we have found to be best for our process are inactive in the alkylation of benzene. It is well known that boron trifluoride is an active alkylating catalyst in the alkylation of benzene and of aromatic hydrocarbons only when used in the form of complexes with strong acids such as sulfuric acid, hydrofluoric acid, trichloroacetic acid, and the like, or with small amounts of water as promoter. Complexes of boron trifluoride with compounds such as ethers, alcohols, and esters are not suitable as catalysts in the alkylation of aromatic hydrocarbons, whereas, in accordance with our invention, they constitute the most suitable catalysts in the alkylation of thiophene. The complexes of boron trifluoride with strong acids and with phenol are not suitable for use as catalysts in the alkylation of thiophene. These complexes cause resinification of the thiophene. Generally speaking, boron trifluoride or any of its catalytically active complexes which do not cause resinification of the thiophene reactant is suitable for effecting the alkylation of thiophene.

It is to be understood that in accordance with the process of the present invention, alkyl thiophenes such as monoalkyl thiophene, for example, methyl thiophene, dialkyl thiophenes, for example, dimethyl thiophene, and trialkyl thiophenes, for example, triethyl thiophene, may just as readily be further alkylated with the boron trifluoride and boron trifluoride complexes of our process.

The alkylating agents to be used in our process may be olefinic hydrocarbons such as propylene, isobutylene, pentenes, isopentenes and higher normal and branched-chain olefinic hydrocarbons; alkyl halides such as amyl chlorides; alcohols such as amyl alcohol; and mercaptans such as butyl mercaptan. Mono-, di-, tri-, and even tetra-alkyl thiophenes may be prepared with such alkylating agents, depending upon the reaction conditions employed. These alkylating agents may be derived from any suitable source and may be used either in the pure state or in admixture with other constituents not undesirable, as is well known in the art. For example, a conventional and preferred source of olefinic hydrocarbons is the fixed gases obtained as by-products of commercial cracking operations around petroleum refineries. These fixed gases may furnish the bulk of the lighter olefinic hydrocarbons, or it may be necessary or desirable to obtain additional supplies, as is well understood. Additional quantities of the lighter olefinic hydrocarbons or other and heavier olefinic hydrocarbons may be easily synthesized, if necessary, from the paraffinic hydrocarbons present in the fixed gases referred to hereinbefore, or from other materials, as is well known to those familiar with the art.

There appears to be nothing particularly critical in the reaction conditions of our process. However, for best results it appears desirable to use a molecular ratio of thiophene to alkylating agent of not much more than two. The reaction rate is largely a function of the temperature, increasing with increasing temperatures, the upper limit of the temperature being that at which dealkylation is favored. Generally speaking, temperatures varying between about 20° C. and about 150° C., and pressures varying between atmospheric and 150 pounds per square inch, have been found satisfactory for effecting the alkylation reaction. The effect of increased pressure, theoretically, is toward increased reaction, but from a practical standpoint, this is not a very great effect with reactions such as those involved herein, which go readily at normal pressures. We have found that the temperature to be employed depends upon the time of reaction and the nature of the alkylating agent used. Ordinarily, we employ a pressure sufficient to maintain the reactants in the liquid phase and we use lower temperatures when the more reactive alkylating agents, for example, isoolefinic hydrocarbons, are employed and higher temperatures when the less reactive alkylating agents, for example, normal olefinic hydrocarbons, are used. Accordingly, the pressure is more or less dependent upon the particular temperature involved, and as a general rule, the higher the temperature, the higher the pressure and the lower the reaction time that may be used. The reaction time depends upon the temperature, the reactivity of the alkylating agent and to a certain extent upon the pressure. Accordingly, it may vary between some minutes and several hours. It must be understood, that these reaction variables are more or less interdependent. Hence, when one is arbitrarily fixed, the limits within which the others may be varied are somewhat restricted. In any particular instance, the most desirable conditions can be readily ascertained by one skilled in the art, the preferred ranges of these variables having been indicated hereinbefore.

The process may be carried out as a batch, continuous or semi-continuous type of operation. Particularly when the process is carried out on a commercial scale, economic considerations make it preferable to operate in a continuous manner. It must be noted, however, that in continuous operation, the temperature to be used may be somewhat above 150° C., in order to effect the reaction with an economical throughput. For efficient operation, whether the process is carried out on a batch or continuous basis, it is essential that the reactants be intimately contacted with the catalyst. This may be achieved in several ways as is well known in the art.

Alkyl thiophenes are useful as special solvents where high solvent power coupled with high density and low-boiling point is desirable, and in the preparation of sulfonates for use as wetting agents, for example. Moreover, alkyl thiophenes are much more desirable than thiophene, itself, in the preparation of hydroxy, amino, and similar derivatives, since the alkylated derivatives are much more stable than those of thiophene. For example, the hydroxy derivative of thiophene polymerizes spontaneously at room temperature, while the hydroxy derivative of an alkyl thiophene generally does not; it is difficult to sulfonate thiophene due to its tendency to resinify in the presence of sulfonic acid while, on the other hand, the reaction of an alkyl thiophene with sulfuric acid leads to sulfonic acid formation only.

The following detailed examples are for the purpose of illustrating modes of effecting the alkylation of thiophene in accordance with our invention, it being clearly understood that the invention is not to be considered as limited to the specific alkylating agents disclosed hereinafter or to the manipulations and conditions set forth in the examples. As it will be apparent to those skilled in the art, a wide variety of other alkyl thiophenes may be prepared by suitable modifications of the alkylating agents.

Example 1

10 cc. of thiophene and 1 cc. of boron trifluoride-etherate (45% $BF_3$ in ethyl ether) were poured into a test tube in that order. Isobutylene was then bubbled into the mixture, while the latter was vigorously stirred at room temperature (25–30° C.). After 15 minutes, the weight of the reaction mixture had more than doubled. On distillation, no unreacted thiophene was found and no diisobutylene could be detected. The product consisted of mono-, di-, and tritertiary butyl thiophene.

Example 2

252 grams of thiophene (3 gram molecular weights) and 15 c. c. of boron trifluoride-etherate (45% $BF_3$ in ethyl ether) were placed in a 500 c. c. flask equipped with a stirrer, a gas-inlet tube, a gas-outlet tube, and a thermometer. Isobutylene was then passed through a flow-meter into the mixture while the latter was vigorously stirred at room temperature (25–30° C.), at a rate of 2 grams per minute, until 178 grams (3 gram molecular weights) had been added. The isobutylene gas was completely absorbed. After washing with water and dilute alkali, the dried product was fractionated through a 30-plate column. The composition of the product was found to be as follows:

| | Per cent by volume |
|---|---|
| Recovered thiophene | 22.3 |
| Fraction boiling at 103–165° C | 2.2 |
| Tertiary butyl thiophene | 23.9 |
| Fraction boiling 182–220° C | 1.2 |
| Di-tertiary butyl thiophene | 41.7 |
| Fraction boiling 225–275° C | 3.7 |
| Tri-tertiary butyl thiophene | 3.2 |
| Residue | 1.8 |

Example 3

170 grams of thiophene (2 gram molecular weights) and 30 c. c. of boron trifluoride-etherate (45% $BF_3$ in ethyl ether) were placed in a 500 c. c. flask equipped with a stirrer, a reflux condenser, and a thermometer. 182 grams of di-isoamylene (1.25 gram molecular weight) boiling at 140–170° C. were then added dropwise through the condenser into the mixture over a period of one hour. The temperature of the mixture was kept at 50–60° C. during the entire period of olefinic hydro-carbon addition and for three hours thereafter. The reaction product was washed with water, dried and distilled. The composition of the reaction product was found to be as follows:

| | Per cent by weight |
|---|---|
| Recovered thiophene | 19.0 |
| Recovered olefinic hydrocarbon | 8.5 |
| Fraction boiling at 180–190° C | 5.0 |
| Amyl thiophene | 8.5 |
| Diamyl and decyl thiophenes (sp. gr. 0.922) | 44.0 |
| Triamyl and amyl decyl thiophenes (sp. gr. 0.922) | 12.0 |
| Residue (sp. gr. 1.030) | 3.0 |

The yield of alkyl thiophenes was roughly 70% of the theoretical.

Example 4

340 grams of thiophene (4 gram molecular weights) and 50 c. c. of boron trifluoride-etherate (45% $BF_3$ in ethyl ether) were placed in a liter flask equipped with a stirrer, a condenser, and a thermometer. 140 grams of di-isoamylene (1 gram molecular weight) were then added dropwise to the mixture over a period of two hours. The temperature of the mixture was kept at 50–60° C. during the entire period of olefinic hydrocarbon addition and for three hours thereafter. The reaction product was washed with water, dried, and distilled with the following results:

| | Per cent by weight |
|---|---|
| Recovered thiophene (sp. gr. 1.06) | 66 |
| Fraction boiling at 110–155° C. (sp. gr. 0.895) | 9 |
| Fraction boiling at 155–230° C. (sp. gr. 0.812) | 19 |
| Residue (sp. gr. 0.926) | 6 |

Approximately 91% of the thiophene and 70% of the di-isoamylene charged were recovered unreacted.

Example 5

The run set forth in Example 4 was repeated except that 63 grams of thiophene (0.75 gram molecular weight), 30 c. c. of boron trifluoride-etherate and 310 grams of di-isoamylene (2.25 gram molecular weights) were used. The results obtained were as follows:

| | Per cent by weight |
|---|---|
| Fraction boiling at 40–70° C. (sp. gr. 0.724) | 3 |
| Thiophene | 0 |
| Recovered olefinic hydrocarbon (sp. gr. 0.775) | 23 |
| Fraction boiling at 190–210° C. (sp. gr. 0.793) | 18 |
| Fraction boiling at 210–235° C. (sp. gr. 0.823) | 10 |
| Fraction boiling at 100–110° C. at 7 mm. (sp. gr. 0.860) | 15 |
| Fraction boiling at 110–122° C. at 7 mm. (sp. gr. 0.894) | 19 |
| Fraction boiling at 127–135° C. at 7 mm. (sp. gr. 0.901) | 7 |
| Triamyl and amyl decyl thiophenes | 5 |

The fractions boiling above 100° C. at 7 mm. pressure contained approximately 25% of olefinic polymers and 75% of alkyl thiophenes.

Example 6

The run set forth in Example 4 was repeated, except that 170 grams of thiophene (2 gram molecular weights), 30 c. c. of boron trifluoride-etherate and 280 grams of di-isoamylene (2 gram molecular weights) were used. The results obtained were as follows:

| | Per cent by weight |
|---|---|
| Recovered thiophene | 7 |
| Recovered olefinic hydrocarbon | 10 |
| Fraction boiling at 190–235° C. (sp. gr. 0.851) | 18 |
| Diamyl and decyl thiophenes (sp. gr. 0.913) | 27 |
| Triamyl and amyl decyl thiophenes (sp. gr. 0.912) | 24 |
| Tetramyl, diamyl decyl, and didecyl thiophenes (sp. gr. 0.916) | 11 |
| Residue | 3 |

Example 7

The run set forth in Example 6 was repeated, except that the total reaction time was two hours, including 1½ hours olefinic reactant addition time. The results obtained were as follows:

| | Per cent by weight |
|---|---|
| Recovered thiophene | 35 |
| Recovered olefinic hydrocarbon | 43 |
| Fraction boiling at 170-230° C. (sp. gr. 0.798) | 18 |
| Residue (sp. gr. 0.913) | 4 |

The yield of alkyl thiophenes was almost neglible.

Example 8

30 grams of thiophene (0.36 gram molecular weight), 140 grams of di-isoamylene (1 gram molecular weight), and 20 c. c. of boron trifluoride-etherate (45% $BF_3$ in ethyl ether) were placed in a 300 c. c. Monel metal autoclave equipped with a stirrer and a heating bath. The mixture was heated to a temperature of 135-140° C. and stirred at that temperature for two hours. The results obtained were as follows:

| | Per cent by weight |
|---|---|
| Sludge and washing loss | 11 |
| Overhead boiling below 230° C. | 16 |
| Diamyl and decyl thiophenes (sp. gr. 0.844) | 25 |
| Triamyl and amyl decyl thiophenes (sp. gr. 0.887) | 39 |
| Tetramyl, diamyl decyl and didecyl thiophenes (sp. gr. 0.888) | 6 |
| Residue | 3 |

The alkyl thiophene fractions contained approximately 50% alkyl thiophenes and 50% olefin polymers as indicated by the specific gravity, sulfur-content, and iodine number of the fractions.

Example 9

170 grams of thiophene (2 gram molecular weights), 280 grams of di-isoamylene (2 gram molecular weights), and 30 c. c. of boron trifluoride-etherate (45% $BF_3$ in ethyl ether) were placed in a liter flask equipped with a stirrer, a condenser, and a thermometer. The mixture was heated to a temperature of 60-80° C. and kept at that temperature for 16 hours. The results obtained were as follows:

| | Per cent by weight |
|---|---|
| Overhead boiling below 230° C. (sp. gr. 0.880) | 8 |
| Diamyl and decyl thiophenes (sp. gr. 0.915) | 44 |
| Triamyl and amyl decyl thiophenes (sp. gr. 0.917) | 27 |
| Tetramyl, diamyl decyl and didecyl thiophenes (sp. gr. 0.917) | 17 |
| Residue (sp. gr. 0.92) | 4 |

The yield of total alkyl thiophenes was roughly 90% of the theoretical.

Example 10

170 grams of thiophene (2 gram molecular weights) and 20 c. c. of boron trifluoride-etherate (45% $BF_3$ in ethyl ether) were placed in a 500 c. c. flask equipped with a stirrer, a condenser, and a thermometer. The mixture was heated to a temperature of 50-60° C. and 140 grams of isoamylene (2 gram molecular weights of 2-methyl butene obtained from the dehydration of tertiary amyl alcohol) were then added to the mixture while the latter was vigorously stirred, over a period of one hour. The temperature of the reaction mixture was kept at 50-60° C. and stirring was continued for three hours after the addition of the isoamylene. The results obtained were as follows:

| | Per cent by weight |
|---|---|
| Recovered olefinic hydrocarbon | 7.3 |
| Recovered thiophene | 24.3 |
| Tertiary amyl thiophene | 21.7 |
| Ditertiary amyl thiophene | 36.7 |
| Higher alkyl thiophenes | 10.0 |

Example 11

The run set forth in Example 4 was repeated except that di-isoamylene was replaced with a $C_{12}$-$C_{15}$ olefin polymer having a boiling point of 170-210° C. and obtained from the polymerization of isobutene with isoamylene. The results obtained were as follows:

| | Per cent by weight |
|---|---|
| Recovered thiophene | 30.0 |
| Butyl thiophene (sp. gr. 0.944) | 7.5 |
| Recovered olefin | 42.0 |
| Alkyl thiophenes (boiling points of 115-210° C. at 7 mm. and sp. gr. 0.920) | 18.5 |
| Residue | 1.5 |

Example 12

85 grams of thiophene (1 gram molecular weight), 76 grams of pentene-1 (1 gram molecular weight), and 22 c. c. of boron trifluoride-etherate (45% $BF_3$ in ethyl ether) were placed in a 300 c. c. Monel autoclave equipped with a stirrer and a heating bath. The mixture was heated to a temperature of 135-140° C. and stirred at that temperature for two hours. The results obtained were as follows:

| | Per cent by weight |
|---|---|
| Sludge and washing loss | 15 |
| Overhead boiling below 170° C. | 9 |
| Amyl thiophene (sp. gr. 0.938) | 15 |
| Diamyl thiophene (sp. gr. 0.916) | 38 |
| Fraction boiling at 125-190° C. at 7 mm. (sp. gr. 0.916) | 14 |
| Residue | 9 |

Example 13

170 grams of thiophene (2 gram molecular weights) and 280 grams of di-isoamylene (2 gram molecular weights) were placed into a liter 3-neck flask equipped with a stirrer and a reflux condenser. Boron trifluoride was bubbled into this solution at room temperature (25-30° C.). After one half hour of boron trifluoride addition, the temperature suddenly rose to 100° C. and an ice bath had to be used to bring the temperature down to 50-60° C. and hold it there. The flow of boron trifluoride was cut off and allowed to bubble into the mixture intermittently during the rest of the reaction. The reaction was stopped after 5 hours and the reaction product was washed with water to remove boron trifluoride and dried. 439 grams of product were recovered which on distillation gave the following results:

| | Per cent by weight |
|---|---|
| Fraction boiling at 60-190° C. (sp. gr. 0.852) | 6 |
| Fraction boiling at 190-230° C. (sp. gr. 0.914) amyl thiophene | 19 |
| Fraction boiling at 40-90° C. at 1 mm. (sp. gr. 0.921) decyl thiophene | 41 |
| Fraction boiling at 90-120° C. at 1 mm. (sp. gr. 0.921) decyl and triamyl thiophene | 25 |
| Residue (sp. gr. 0.947) | 9 |

A number of runs was made using 170 grams of thiophene (2 gram molecular weights), 280 grams of di-isoamylene (2 gram molecular weights) and 30 c. c. of different boron trifluoride complexes. The reactants and the catalyst were placed in a liter flask equipped with a stirrer, a condenser, and a thermometer. The reaction temperature was 50–60° C. and the reaction time was 5 hours. For convenience, the experimental data and the results are tabulated in the following table:

| Example No. | 14 | 15 | 16 |
|---|---|---|---|
| BF₃ complex | ethyl acetate | ethyl alcohol | acetic acid |
| BF₃-content, per cent by weight | 40 | 59 | 21 |
| *Results* | | | |
| Sludge and washing loss, per cent by weight | 9 | 9 | 10 |
| Overhead boiling below 240° C., per cent by weight | 18 | 35 | 44 |
| Specific Gravity | | | 0.855 |
| Alkylated thiophenes, per cent by weight | 67 | 48 | 43 |
| Specific Gravity | 0.917 | | 0.922 |
| Residue, per cent by weight | 6 | 6 | 3 |
| Specific Gravity | 0.947 | | |

Example 17

84 grams of thiophene (1 gram molecular weight), 44 grams of propylene (1 gram molecular weight), and 10 c. c. of boron trifluoride-etherate (45% BF₃ by weight in ethyl ether) were placed in a 300-c. c. Monel autoclave equipped with a stirrer and a heating bath. The mixture was stirred at room temperature (25–30° C.) for four hours and then at a temperature of 90–95° C. for two hours. The following results were obtained:

|  | Per cent by weight |
|---|---|
| Sludge and washing loss | 24 |
| Recovered thiophene | 66 |
| Propyl thiophene (sp. gr. 0.976) | 7 |
| Residue | 3 |

Example 18

150 grams of thiophene (1.8 gram molecular weights) and 20 c. c. of boron trifluoride-etherate (45% BF₃ by weight in ethyl ether) were placed in a liter flask equipped with a stirrer, a condenser and a thermometer. The mixture was heated to a temperature of 50–60° C. No hydrogen chloride was evolved during this period. This could be accounted for by the presence of water in the tertiary amyl chloride. 100 c. c. of boron trifluoride-etherate were then added and for the next three hours, hydrogen chloride was evolved at a rapid rate. The following results were obtained:

|  | Per cent by weight |
|---|---|
| Sludge and washing loss | 11 |
| Fraction boiling at 50–140° C | 31 |
| Amyl thiophene (sp. gr. 0.944) | 15 |
| Diamyl thiophene (sp. gr. 0.917) | 28 |
| Thiophene polymer (sp. gr. 1.0) | 11 |
| Residue | 3 |

Example 19

170 grams of thiophene (2 gram molecular weights) and 30 c. c. of boron trifluoride-etherate (45% BF₃ by weight in ethyl ether) were placed in a liter flask equipped with a stirrer, a condenser and a thermometer. The mixture was heated to a temperature of 50–60° C. and 148 grams of tertiary butyl alcohol (2 gram molecular weights) were then added to the mixture from a dropping funnel over a period of one hour, while the mixture was stirred. The reaction seemed to proceed at first but as more alcohol was added, it stopped. 80 c. c. of boron trifluoride-etherate were then added and the reaction mixture was stirred for four hours. The following results were obtained:

|  | Per cent by weight |
|---|---|
| Sludge and washing loss | 12 |
| Fraction boiling at 50–140° C | 33 |
| Butyl thiophene (sp. gr. 0.937) | 30 |
| Dibutyl thiophene (sp. gr. 0.919) | 22 |
| Residue | 3 |

Example 20

168 grams of thiophene (2 gram molecular weights), 93 grams of tertiary butyl mercaptan (1 gram molecular weight), and 20 c. c. of boron trifluoride-etherate (45% BF₃ by weight in ethyl ether) were placed in a liter flask equipped with a stirrer, a reflux condenser, and a thermometer. The mixture was heated to a temperature of 75–85° C. and stirred for four hours. Hydrogen sulfide was evolved throughout the reaction. The following results were obtained:

|  | Per cent by weight |
|---|---|
| Sludge and washing loss | 36 |
| Fraction boiling at 35–150° C | 30 |
| Butyl thiophene (sp. gr. 0.955) | 11 |
| Dibutyl thiophene (sp. gr. 0.918) | 16 |
| Residue | 7 |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process for obtaining alkyl thiophenes which comprises contacting one of the group thiophene and thiophene derivatives having at least one hydrogen atom of the thiophene nucleus replaceable, with an alkylating agent in the presence of boron trifluoride as the essential alkylating catalyst, the molal ratio of said alkylating agent to said thiophene and thiophene derivatives being greater than 0.25, the reaction temperature being at least about 20° C. and the reaction time being at least 1.5 hours at 25° C., said reaction temperature and time being interdependent and varying with the activity of the alkylating agent and the higher the reaction temperature the shorter the reaction time for any alkylating agent.

2. The process for obtaining alkyl thiophenes which comprises contacting one of the group thiophene and thiophene derivatives having at least one hydrogen atom of the thiophene nucleus replaceable with an olefinic hydrocarbon having 3 to about 15 carbon atoms in the molecule in the presence of an alkylating catalyst having boron trifluoride as the essential component, the molal ratio of olefinic hydrocarbon to said thiophene and thiophene derivative being greater than 0.25, the reaction time being at least 1.5 hours at 25° C., and the reaction temperature being at least 20° C., the more active the olefinic hydrocarbon the lower the reaction temperature and the higher the reaction temperature the shorter the reaction time.

3. The process for obtaining alkyl thiophenes which comprises contacting an alkyl halide with one of the group thiophene and thiophene derivatives having at least one hydrogen atom of the thiophene nucleus replaceable in the presence of an alkylating catalyst having as the essential component boron trifluoride, the reaction temperature being 20° to 150° C. and the reaction time being shorter the higher the temperature and being at least 3 hours at 50° C.

4. The process for obtaining alkyl thiophenes which comprises contacting an aliphatic alcohol with one of the group thiophene and thiophene derivatives having at least one hydrogen atom of the thiophene nucleus replaceable in the presence of an alkylating catalyst having boron trifluoride as the essential component, the reaction temperature being 20° to 150° C., the reaction time being shorter for higher temperatures and the reaction time being about 5 hours for a reaction temperature of 50° C.

5. The process as set forth and described in claim 1 wherein the boron fluoride is added to the reaction mixture as a boron trifluoride complex.

6. The process as set forth and described in claim 1 wherein the boron trifluoride is used as a boron trifluoride etherate complex.

7. The process as set forth and described in claim 1 wherein the boron trifluoride is used as a boron trifluoride-alcohol complex.

8. The process as set forth and described in claim 1 wherein the boron trifluoride is used as a boron trifluoride complex with an ester of an organic acid.

ROWLAND C. HANSFORD.
PHILIP D. CAESAR.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,271,093 | Pier | Jan. 27, 1942 |

FOREIGN PATENTS

| Number | Country | Date |
|---|---|---|
| 453,422 | Great Britain | Sept. 4, 1936 |

OTHER REFERENCES

Alles, J. Pharm. and Exp. Ther., 72, 265 (1941).

Whitmore, "Organic Chemistry," page 893, Van Nostrand, N. Y., 1937.

Richter, "Organic Chemistry," pages 649-50, John Wiley, N. Y., 1938.

Kutz et al., J. Am. Chem. Soc., 68, 1477-79 (1946).

Certificate of Correction

Patent No. 2,469,823.  May 10, 1949.

ROWLAND C. HANSFORD ET AL.

It is hereby certified that errors appear in the printed specification of the above numbered patent requiring correction as follows:

Column 3, line 23, for "alklation" read *alkylation*; column 9, line 41, Example 18, for "20 c. c." read *30 c. c.*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*